US010477988B2

(12) United States Patent
Bryan et al.

(10) Patent No.: US 10,477,988 B2
(45) Date of Patent: Nov. 19, 2019

(54) TAPE FOR MODULAR SHELF SYSTEM

(71) Applicant: Walmart Apollo, LLC, Bentonville, AR (US)

(72) Inventors: Greg Bryan, Bentonville, AR (US); Matthew Jones, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 47 days.

(21) Appl. No.: 15/937,122

(22) Filed: Mar. 27, 2018

(65) Prior Publication Data

US 2018/0279806 A1 Oct. 4, 2018

Related U.S. Application Data

(60) Provisional application No. 62/478,983, filed on Mar. 30, 2017.

(51) Int. Cl.

| | |
|---|---|
| ***A47F 5/00*** | (2006.01) |
| ***G06Q 10/08*** | (2012.01) |
| ***A47F 5/10*** | (2006.01) |
| ***G09F 3/10*** | (2006.01) |
| ***A47F 13/00*** | (2006.01) |

(52) U.S. Cl.

CPC ............ *A47F 5/103* (2013.01); *A47F 5/0018* (2013.01); *A47F 5/0043* (2013.01); *A47F 13/00* (2013.01); *G09F 3/10* (2013.01)

(58) Field of Classification Search

CPC .......... A47F 5/103; A47F 5/0018; A47F 5/10; A47F 1/126

See application file for complete search history.

(56) References Cited

U.S. PATENT DOCUMENTS

| | | | | | |
|---|---|---|---|---|---|
| 2,053,810 | A * | 9/1936 | Bisel | A41H 1/04 33/2 R | |
| 2,934,181 | A * | 4/1960 | Weber | A47F 5/103 312/108 | |
| 3,346,316 | A | 10/1967 | Morioka et al. | | |
| 4,348,965 | A | 9/1982 | Swanson | | |
| 4,366,623 | A * | 1/1983 | Bergqvist | G01B 3/1084 33/763 | |
| 5,224,609 | A | 7/1993 | Bauer et al. | | |

(Continued)

OTHER PUBLICATIONS

"Assembly: Shelving Units with Pocket Holes", Hello Wood Products; http://www.hellowood.com/instrshelving.htm; accessed Jan. 10, 2017 (4 pp).

(Continued)

*Primary Examiner* — Kimberley S Wright

(74) *Attorney, Agent, or Firm* — Venable LLP; Jeffri A. Kaminski

(57) ABSTRACT

A system and method are disclosed which facilitate installation of modular shelving through utilization of a notch indication tape. The notch identification tape may include an adhesive surface and an opposing identification surface having a plurality of identification markers. The identification markers can be numbers, letters, a combination thereof, or any other identification scheme. The notch identification tape may be placed on a vertical plane of a modular shelf so that it adheres to the vertical plane in order to identify specific notches on the vertical plane.

18 Claims, 6 Drawing Sheets

(56) References Cited

U.S. PATENT DOCUMENTS

| | | | | |
|---|---|---|---|---|
| 5,348,485 | A * | 9/1994 | Briechle | H01R 25/14 439/110 |
| 5,573,124 | A | 11/1996 | Frost | |
| 5,695,261 | A * | 12/1997 | Slesinger | A47F 11/10 312/223.6 |
| 6,089,453 | A * | 7/2000 | Kayser | G06Q 30/06 235/378 |
| 6,378,710 | B1 | 4/2002 | Grueneberg | |
| 6,644,609 | B1 * | 11/2003 | Scott | A47B 57/42 248/243 |
| 7,891,106 | B2 * | 2/2011 | Dunham | G01B 3/04 33/486 |
| 8,626,613 | B2 | 1/2014 | Dale et al. | |
| 8,629,772 | B2 * | 1/2014 | Valiulis | G08B 13/149 211/57.1 |
| 9,318,007 | B2 * | 4/2016 | Valiulis | G08B 13/14 |
| 10,024,662 | B2 * | 7/2018 | Bryan | A47F 10/00 |
| 2007/0108273 | A1 * | 5/2007 | Harper | G06Q 10/087 235/382 |
| 2007/0194002 | A1 | 8/2007 | Fisher et al. | |
| 2008/0121146 | A1 * | 5/2008 | Burns | A47F 5/101 108/23 |
| 2008/0284654 | A1 * | 11/2008 | Burnside | G06K 7/0008 343/700 MS |
| 2011/0084627 | A1 * | 4/2011 | Sloan | F21S 4/20 315/297 |
| 2012/0228240 | A1 * | 9/2012 | Gentile | A47F 5/08 211/1 |
| 2015/0076092 | A1 | 3/2015 | Tambornino et al. | |
| 2016/0134930 | A1 * | 5/2016 | Swafford | A47F 5/0068 725/80 |
| 2017/0178463 | A1 * | 6/2017 | Wise | G07G 1/0018 |
| 2017/0299387 | A1 * | 10/2017 | Bryan | G01B 11/0608 |
| 2018/0103781 | A1 * | 4/2018 | Taylor | A47F 5/103 |
| 2018/0184803 | A1 * | 7/2018 | Bellar | A47B 96/061 |
| 2018/0242761 | A1 * | 8/2018 | Jones | A47F 11/10 |
| 2018/0244293 | A1 * | 8/2018 | Murray | B62B 3/02 |
| 2018/0255944 | A1 * | 9/2018 | Ford | A47F 11/10 |

OTHER PUBLICATIONS

"Organizing and Labeling Your Warehouse Locations", Jazva; https://help.jazva.com/hc/en-us/articles/210263263-Organizing-and-Labeling-Your-Warehouse-Locations; accessed Jan. 10, 2017 (3 pp).

"Euro LT Hybrids"; https://classicexhibits.com/setupinstructions/LTK-1154%20Setup.pdf; accessed Jan. 10, 2017 (3 pp).

Rieger, M., "Packing, Labeling, and Shelving at the National Archives", The American Archivist (pp. 417-426).

"Man-Down Card Holders and Label Mounts", Shelf Tag Supply; http://www.shelftagsupply.com/man-down_holders.htm; accessed Jan. 10, 2017 (2 pp).

International Search Report and Written Opinion dated Jun. 21, 2018 in corresponding International Application No. PCT/US18/24550 (13 pp).

* cited by examiner

TAPE FOR MODULAR SHELF SYSTEM

BACKGROUND

1. Technical Field

The present disclosure relates to an indication tape and more specifically to the utilization of the indication tape in an interchangeable modular shelf framework.

2. Introduction

Retail shelving systems are found in almost every store and supermarket. Shelves may be standardized such that the shelves are not removable, and the entire rack cannot be customized. Retail shelving as described does not allow for customized shelving components being mixed within a single vertical support plane. Once installed, the installed shelving components are static, meaning they cannot be changed without removing the entire component from the hooks which attach to the vertical plane.

In other types of shelving, the shelving bays are held together by vertical, back panels which hold the individual shelves. In many cases, the vertical panels are plain, meaning just a flat surface, but perforated vertical panels are available which can allow pegboard hooks for hanging products. The vertical panel often has holes running vertically, with the holes being used to engage with hooks in the shelving, such that individual shelves can be adjusted to fit as desired. When circumstances require a different storage system, such as a basket, or a gravity-fed can storage system, the entire shelf must be removed and replaced with the alternative unit hooking into the vertical panel.

A "gondola rack" may be used, where the gondola rack comprises a shelf that is preferably mobile and easily modified. The modular framework of the gondola rack may include a notched vertical panel that supports modular shelves having hooked tabs that may be inserted in the notches on the vertical panel. In this way, shelving may be configured to be interchangeable and modular. The display components can be combined with other display components resulting in different combinations of display components within the space normally devoted to a single shelf (i.e., the space between the hanging holes of the vertical plane). Additionally, the display components can be removed and replaced within the modular shelving framework described herein, without the entire shelf being removed.

Shelving may be optimally reorganized or restocked for reasons like seasonal events, holidays, emergency or weather situations, or even the time of day. For instance, a particular shelf arrangement may be designed based on perceived user interest in items due to the season, size and weight of the items, and the expected eye-level of a target customer. The arrangement may be designed to be implemented in a number of stores world-wide, regionally, or simply at a single store.

However, restocking and reorganizing shelving on a gondola rack can be extremely time consuming and require significant personnel staffing, particularly for large retail displays. Also, due to the varying size and weight of retail items, personnel may not know where to place certain shelves to accommodate all the retail items, which may waste time and also result in inefficient displays. Further, shelf designs may be hard to understand or implement by personnel, as the notches in the vertical panel are often close together and are great in number. When trying to implement a design that identifies particular notches by number, personnel may also lose count while counting to a particular notch identified in the design.

Thus, there is a need for a simple modular shelf organization system, where personnel members can easily identify where shelving should be installed.

SUMMARY

A modular shelf organization system for a gondola rack is disclosed, the modular shelf organization system including a first marking member adapted to adhere to a vertical plane of a gondola rack, wherein the vertical plane comprises a first plurality of notches arranged in a vertical line along the vertical plane; the first marking member comprising one or more identifiers located on a longitudinal surface of the first marking member such that when the first marking member is adhered to the vertical plane, each identifier is located adjacent to one of the first plurality of notches. The modular shelf organization system including one or more display items adapted to attach to the notches on the vertical plane.

A method for modular shelf organization of a gondola rack is disclosed, the method including: attaching a first marking member comprising one or more identifiers located on a longitudinal surface of the first marking member to a vertical plane of a gondola rack comprising a first plurality of notches arranged in a vertical line along the vertical plane, wherein the attaching step comprises attaching the first marking member such that each identifier is located adjacent to one of the first plurality of notches; determining an attachment position for a removable display item based on a first identifier from the one or more identifiers, wherein the determining step comprises selecting a first notch of the first plurality of notches that is located adjacent to the first identifier; attaching the removable display item comprising an attachment member to the vertical plane by inserting the attachment member into the first notch such that the removable shelf is perpendicular to the vertical plane.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

A system and method are disclosed which facilitate installation of modular shelving through utilization of a notch indication tape.

Various embodiments of the disclosure are described in detail below. While specific implementations are described, it should be understood that this is done for illustration purposes only. Other components and configurations may be used without parting from the spirit and scope of the disclosure.

The systems, devices, and methods of the present invention are directed to a notch identification tape for modular shelving having notches to receive shelves. Descriptions of the notch identification tape may be applied to any other type of shelving.

Figure 1:
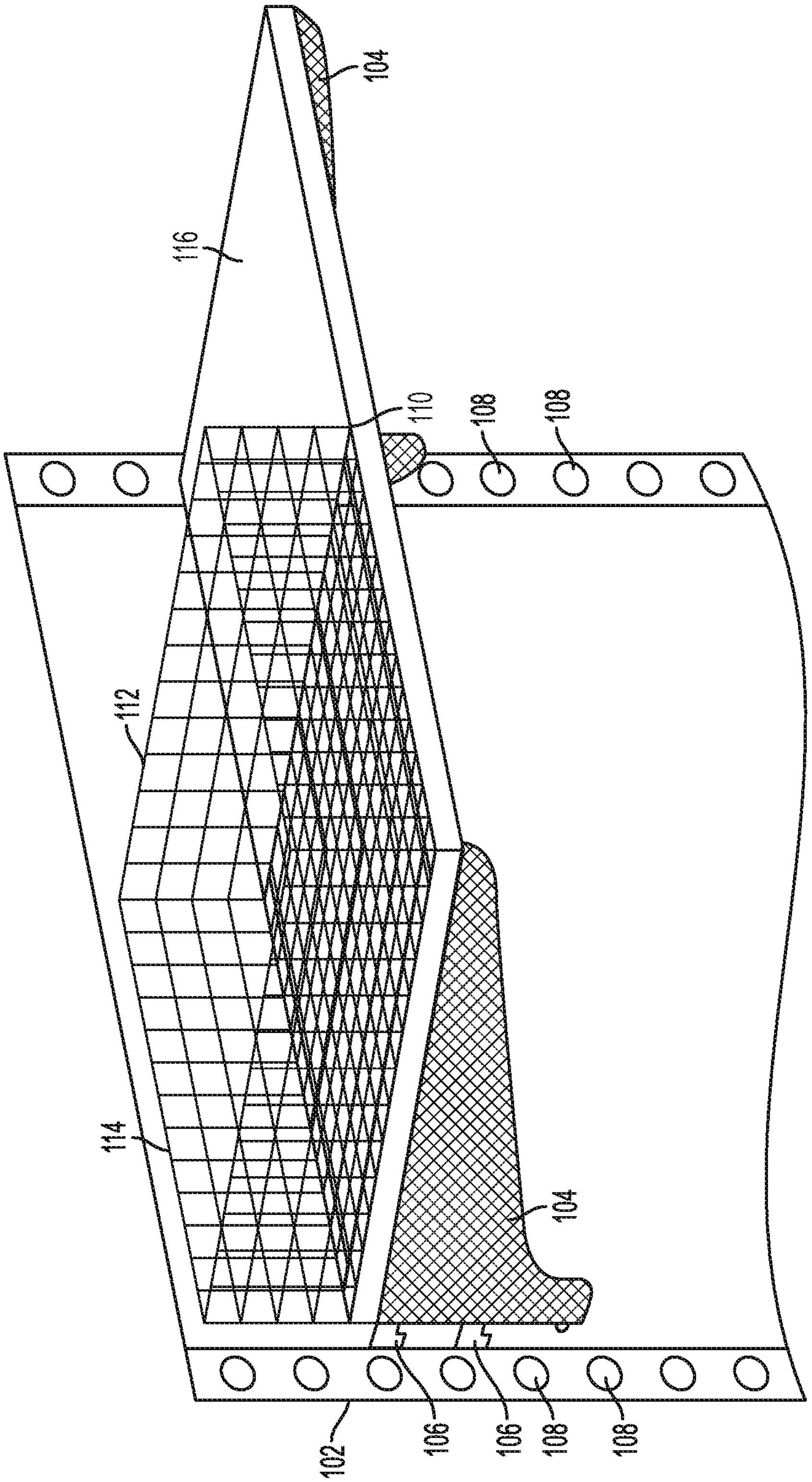
FIG. 1 illustrates an exemplary modular shelf that may be used in conjunction with the described system.

FIG. 1 shows an exemplary configuration of an exemplary modular shelf that may be used in conjunction with the described notch identification tape. The interchangeable modular framework 104, 110, 112 includes a basket component 114 and a shelf component 116. The interchangeable modular framework in this example is made of two support arms 104, with a first longitudinal member 112 and a second longitudinal member 110. In some embodiments the support arms 104 have hooks, pegs, or other engagement mechanisms 106 which can be used to connect with holes 108 of a vertical plane 102 as part of a gondola shelving system, or "gondola rack." The first longitudinal member 112 is located on the "back" portion of the support arms, nearest to the vertical plane 102. The second longitudinal member 110 is located on the "front", or aisle facing, portion of the support arms. In another embodiment, the framework may include a rectangular or square frame which is secured to the support arms, which are connected to the vertical plane.

The support arms 104, the first longitudinal member 112, and the second longitudinal member 112 together form a rectangle (or a square, or other parallelogram), as the support arms are substantially in parallel with one another, the first and second longitudinal members are substantially in parallel with one another, and the support arms are substantially perpendicular to the longitudinal members. "Substantially" can be interpreted to be within 15° of the desired angle, and preferably within 5°. The rectangle of the support arms 104, the first longitudinal member 112, and the second longitudinal member 110 is an interchangeable modular framework which can accommodate multiple display components within the longitudinal space between the notches 108 of the vertical plane 102.

In this example, the framework has a basket 114 and a shelf 116, such that the combined basket 114 and shelf 116 cover the framework formed by the support arms 104 and the longitudinal members. In some configurations, the interchangeable modular framework may be configured to leave gaps within the framework, such as when there is space for three display components but only two are utilized. In other configurations, there may be more than two display components.

Figure 2A:
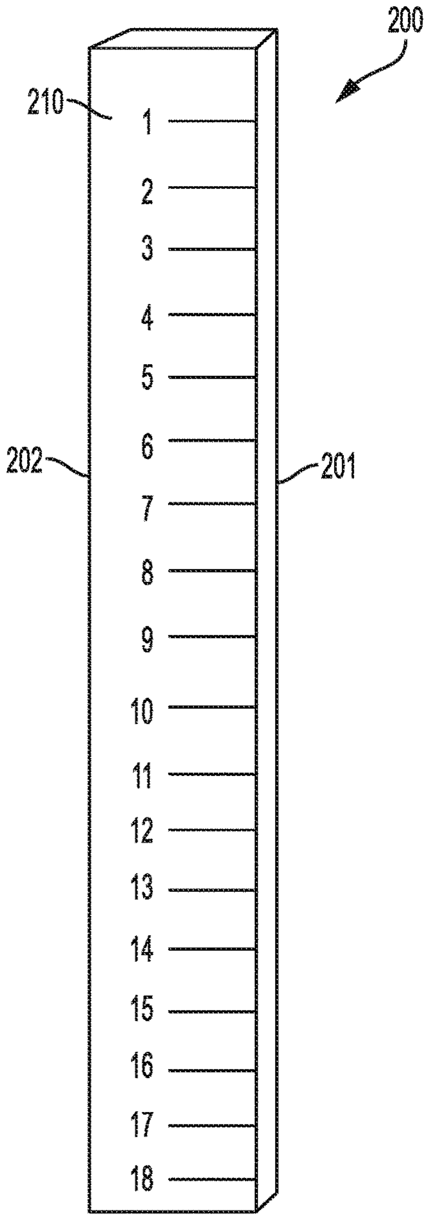
FIG. 2*a* illustrates an example configuration of a notch identification tape.

FIG. 2*a* shows an exemplary configuration of a notch identification tape. The notch identification tape 200 includes an adhesive surface 201 and an opposing identification surface 202. The identification surface 202 includes a plurality of identification markers 210. The identification markers may be in the visible spectrum, the IR spectrum, etc. and can be numbers, letters, a combination thereof, or any other identification scheme. As shown in FIG. 2*a*, the identification markers can be ordered in a decreasing manner. The notch identification tape 200 may be placed on a vertical plane 102 of the modular shelf in order to identify specific notches 108 of the vertical plane 102. When the notch identification tape 200 is placed on the vertical plane 102, the adhesive surface 201 attaches to the vertical plane 102 so that the notch identification tape 200 adheres to the vertical plane 102, and the identification markers 210 decrease as counted from the top of the vertical plane 102.

Figure 2B:
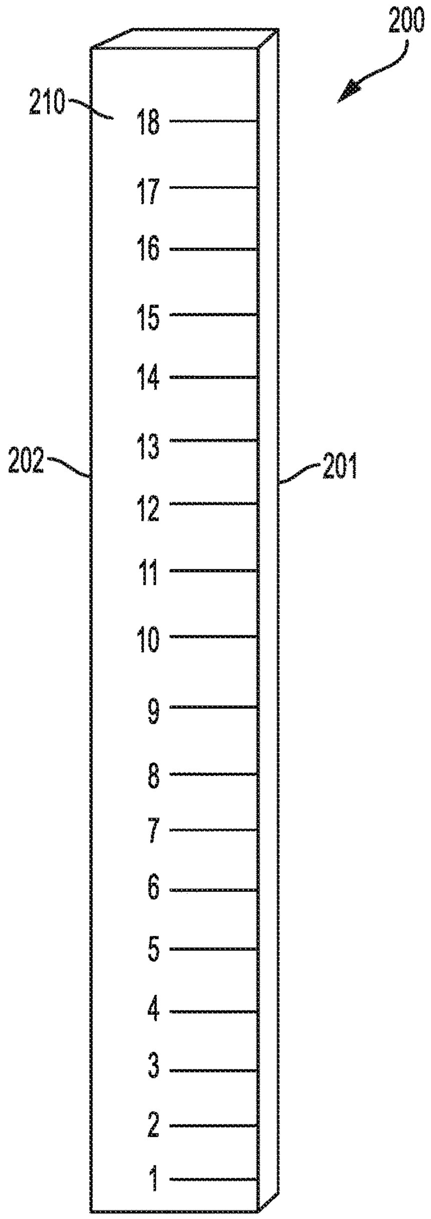
FIG. 2*b* illustrates an example configuration of a notch identification tape.

FIG. 2*b* shows another exemplary configuration of a notch identification tape. The notch identification tape 200 can include an identification surface 202 that includes a plurality of identification markers 210, which can be ordered in a decreasing fashion. When the notch identification tape 200 is placed on the vertical plane 102, the adhesive surface 201 attaches to the vertical plane 102 so that the notch identification tape 200 adheres to the vertical plane 102, and the identification markers 210 increase as counted from the bottom of the vertical plane 102.

Preferably, the notch identification tape 200 may be placed on the vertical plane 102 such that the identification markers 210 of notch identification tape 200 are aligned with the notches 108 on the vertical plane 102. Preferably, each notch 108 on the vertical plane that is arranged in a vertical line is identified by one of the identification markers 210 on the notch identification tape 200. For a vertical plane 102 that has notches 108 that are arranged in more than one vertical lines, additional strips of the notch identification tape 200 may be placed on the vertical plane 102. The strips of the notch identification tape 200 may have different identification markers 210 from each other. Alternatively the strips of notch identification tape 200 may have the same numbering schemes on each strip.

Figure 3:
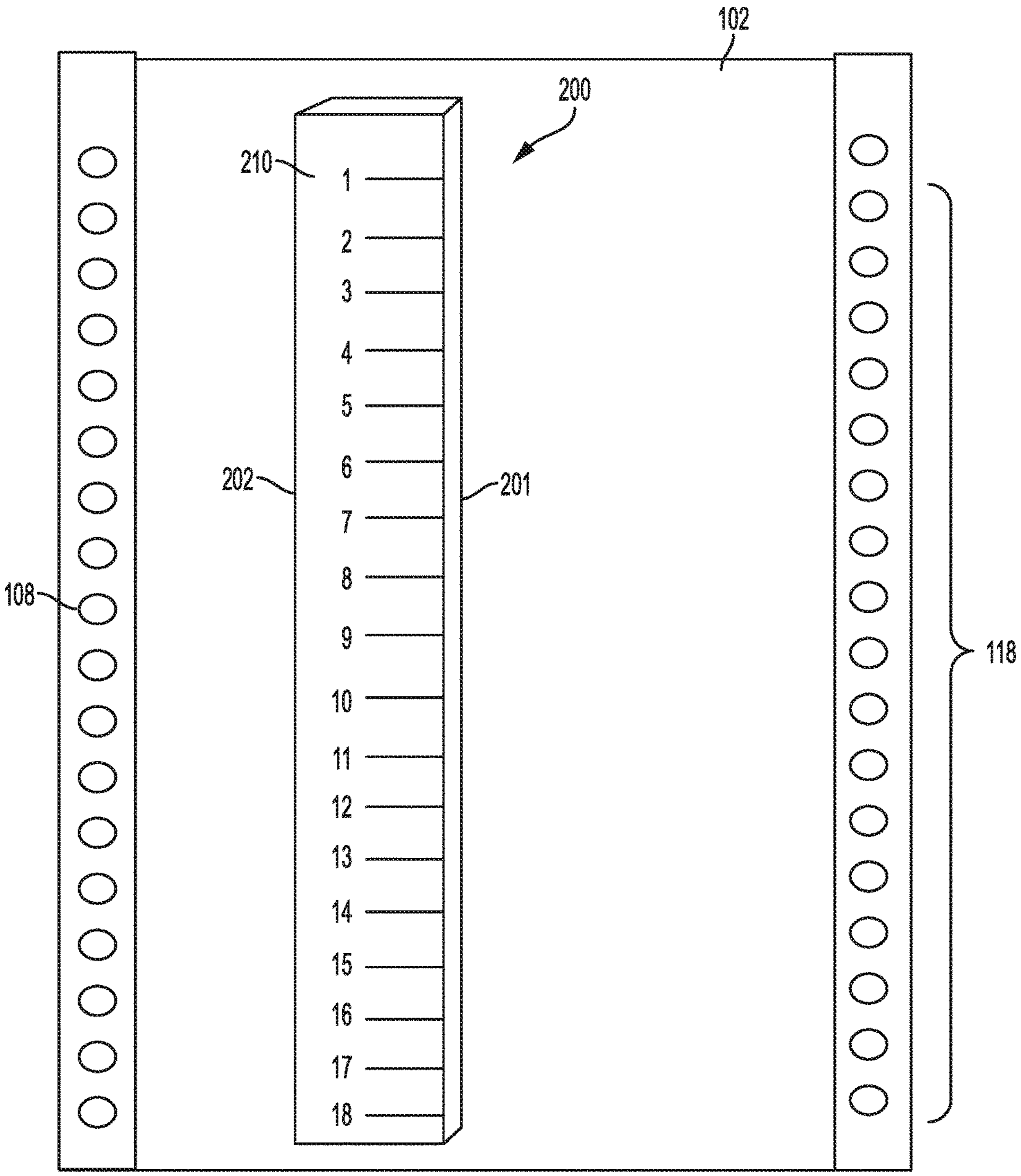
FIG. 3 illustrates an exemplary configuration of the notch identification tape in conjunction with the exemplary modular shelf.

FIG. 3 shows an exemplary configuration of the notch identification tape 200 placed on the vertical plane 102. As shown, a plurality of notches 108 are arranged such that they form a plurality of vertical lines 118. In this exemplary configuration, each vertical line 118 has a strip of notch identification tape 200 placed adjacent to it. In other examples, only one strip of notch identification tape 200 may be used or a strip of notch identification tape 200 may be arranged apart from the vertical line 118. Further, each notch 108 in each vertical line 118 has an identification marker 210 located adjacent to the notch 108. In this way, personnel seeking to attach a shelf 116 or basket 116, or any other display item, according to a predetermined design, may simply look to the notch identification tape 200 to identify the correct notch 108 in which to place the display item. The identification surface 202 of tape 200 may be made of any durable material, like a polymer, aluminum, or rubber. The adhesive surface 201 may be made of any adhesive material, including glue, beeswax, etc. The adhesive surface 201 may also be magnetic, such that it adheres to a metallic surface. The adhesive surface 201 may also use static electricity to cling to a surface.

Figure 4A:
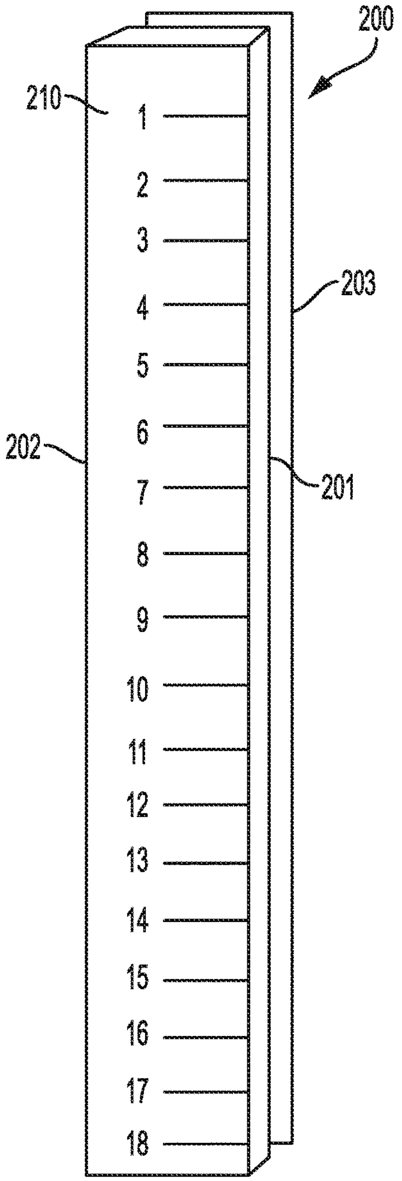
FIG. 4*a* shows exemplary configurations of the notch identification tape in its unused state.
Figure 4B:
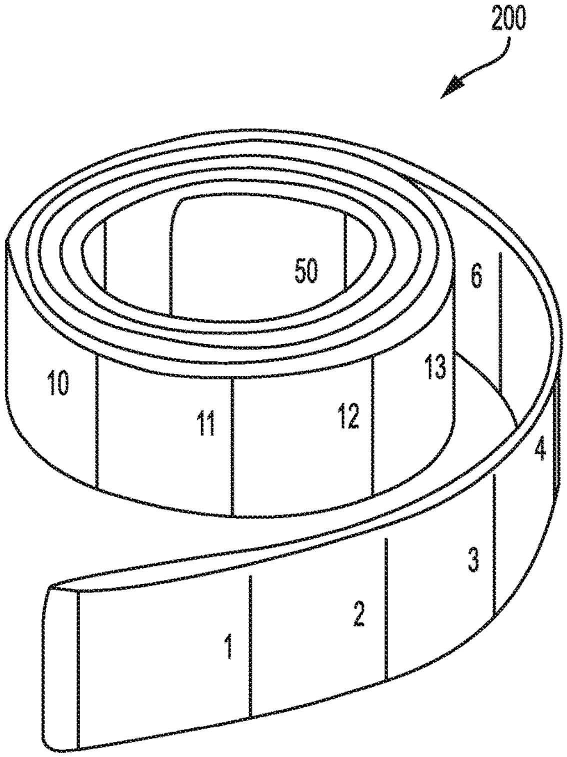
FIG. 4*b* shows exemplary configurations of the notch identification tape in its unused state.

FIG. 4*a*-*b* shows exemplary configurations of the notch identification tape 200 in its unused state. For instance, the notch identification tape 200 may be stored in strips, as shown in FIG. 4*a*, with a protective strip 203 adjacent to the adhesive side 201 of the notch identification tape 200. This allows for the notch identification tape 200 to be easily applied without having to measure the length of the tape. Alternatively, as shown in FIG. 4*b*, the notch identification tape 200 may be stored in a roll. While a user must then measure out the appropriate length of the tape prior to application, this allows for more manageable storage. Further, the notch identification tape 200 may be perforated at segments so that no measurement is necessary.

The notch identification tape 200 may be placed on the vertical plane 102 by removing the protective strip 203 to expose the adhesive side 201, or to simply unroll a portion of the tape 200 from the roll. A user may then apply the tape 200 on the vertical plane by determining a specific reference point on the plane 102, and applying the tape 200 based on the reference point.

Using the notch identification tape as described, after the notch identification tape 200 is applied to a modular shelf, personnel will be able to quickly identify a particular notch on the vertical plane 102, by reviewing the identification markers 210 on the tape 200. A user may be able to review a pre-determined shelf design plan that identifies a particular display item (i.e. basket 114 or shelf 116) for a particular gondola rack, and the identifier for the notch 108 that the display item should be inserted into. Upon determining the identifier for the notch 108, the user may then look to the applied notch identification tape 200, locate the same identifier of the identification markers 210 on the tape 200, and place the display item in the appropriate notch 108.

Figure 5:
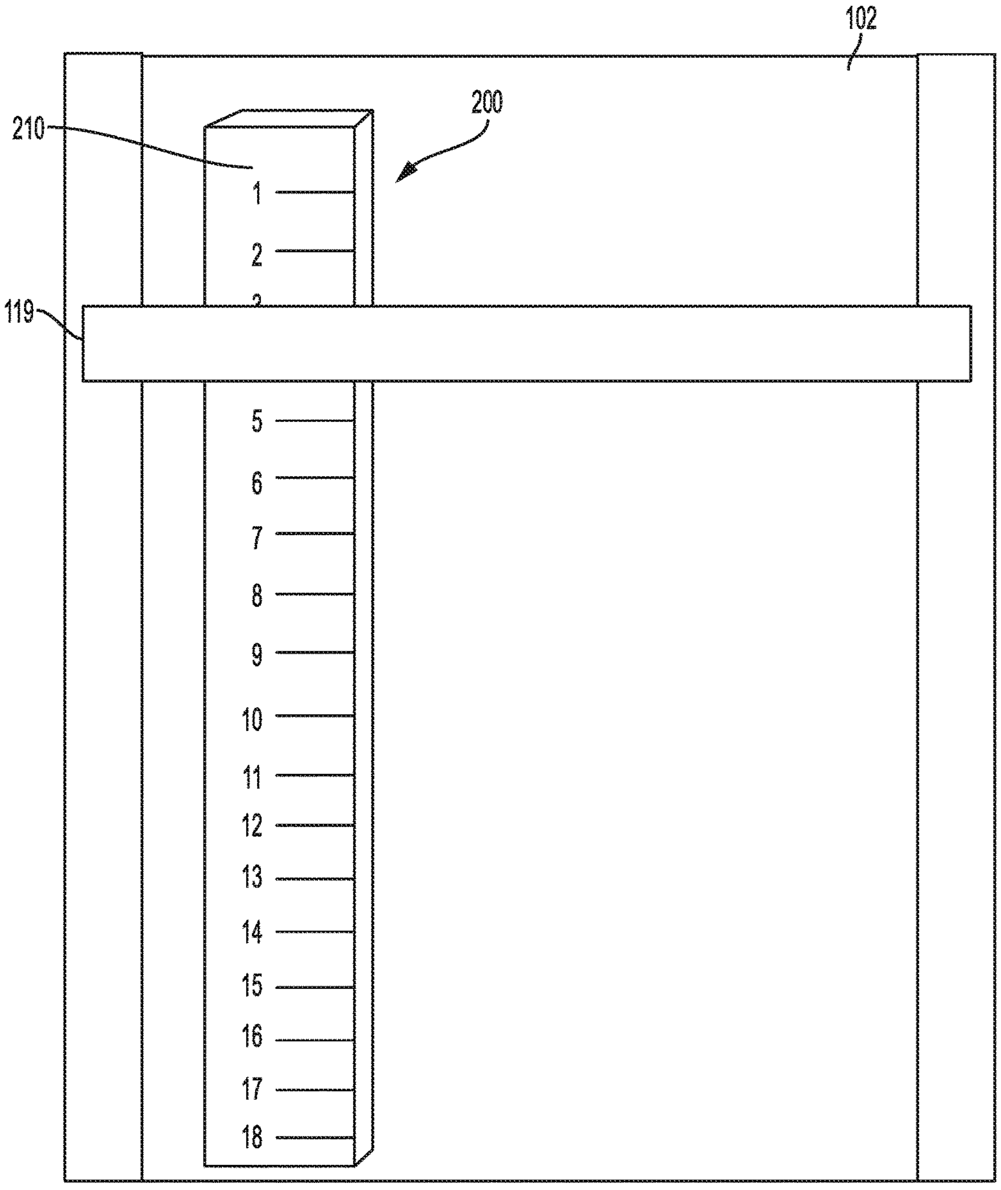
FIG. 5 shows an exemplary configuration of the notch identification tape in conjunction with an exemplary motorized shelf.

The notch identification tape as described may also be utilized with motorized modular shelves. For instance, a gondola rack may include shelves that may move in a vertical direction after the shelves are attached to a mechanism that allows for the shelves to move vertically via a motor within the gondola rack. FIG. 5 shows an exemplary gondola rack with motorized shelves 119. In this situation, the notch identification tape 200 may be attached to the vertical plane 102 of the shelf, such that one or more of the identification markers 210 on the tape 200 may be aligned with a reference point on the vertical plane 102. In an embodiment, the motorized shelves may be moved by a user, using the identification markers 210 on the notch identification tape 200 as references for how far to move the shelf. In this manner, the user may begin to move a particular shelf and then continue to move the shelf until it is aligned with a particular identification marker 210.

The notch identification tape may also be utilized with motorized modular shelves that are capable of being moved automatically. These motorized modular shelves are described in further detail in U.S. Provisional Patent Application No. 62/475,273. In an embodiment, the motorized shelves may be moved automatically to a particular vertical point along the gondola rack. In this situation, the notch identification tape 200 may be attached to the vertical plane 102 of the shelf, such that one or more of the identification markers 210 on the tape 200 may be aligned with a reference point on the vertical plane 102. Movement of the shelf 119 may be guided by the notch identification tape 200.

Figure 6:
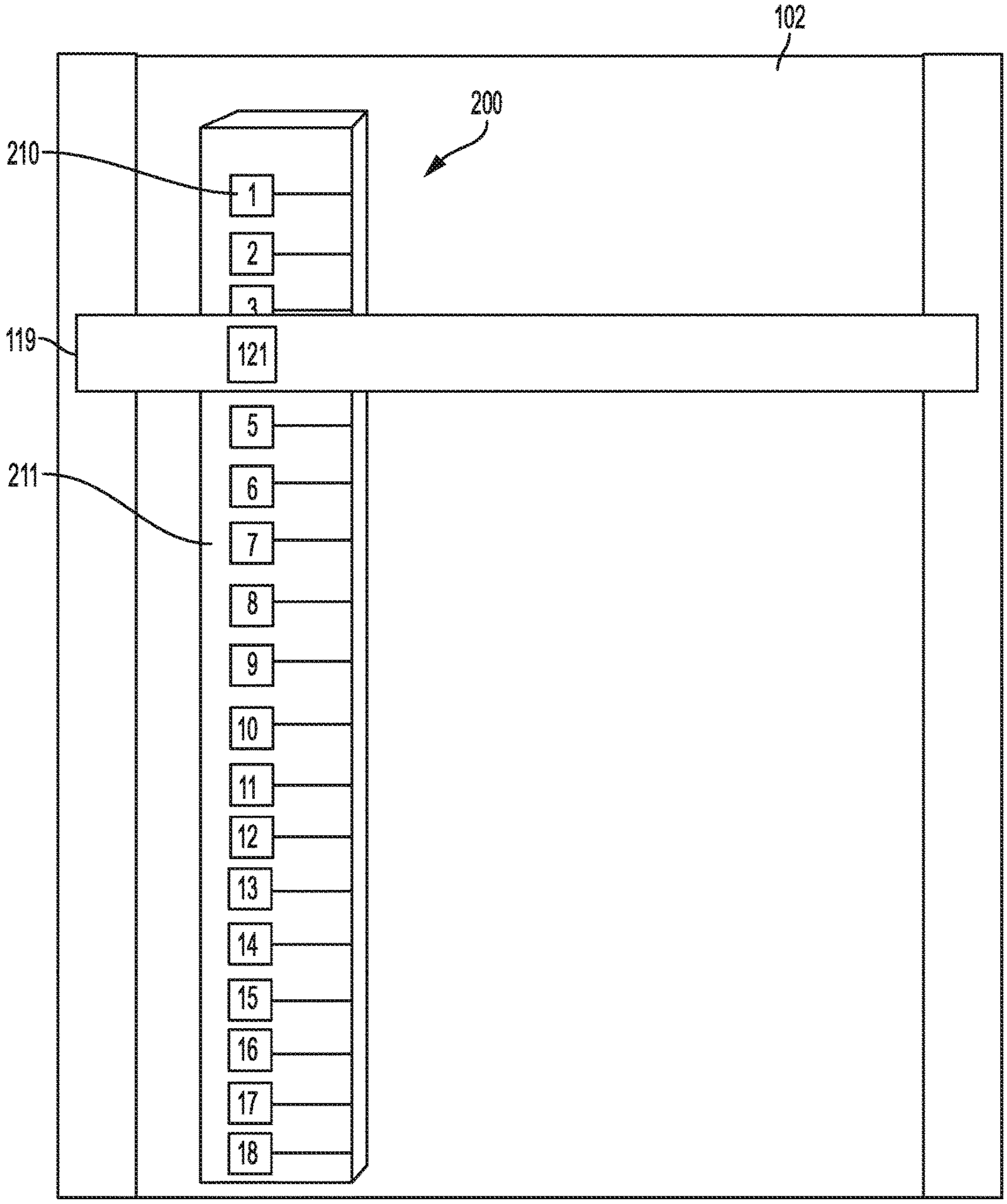
FIG. 6 shows another exemplary configuration of the notch identification tape in conjunction with an exemplary motorized shelf.

For example, as shown in FIG. 6, the notch identification tape 200 may be equipped with sensor trigger elements 211, each located at one or more of the identification markers 210, so that a sensor 121 on the shelf may be triggered when the shelf is aligned with the sensor trigger element 211 and identification marker 210. This may assist with more precise automatic movement of the motorized shelf 118.

The sensor trigger element 211 and sensors 121 may utilize any sensor technology known in the art. For instance, the sensor trigger element may utilize RFID, ultrasonic, or infrared to trigger a sensor. The sensor trigger element 211 may be embedded in the notch identification tape 200, or placed on the surface of the notch identification tape. The sensor trigger element 211 may be included as part of the identification marker 210.

The sensor trigger element 211 may also be a visual sensor trigger element. For example, the sensor trigger element 211 may be a LED, hologram, or other visual element. Sensor trigger element 211 may be formed of Digimarc barcoding, which is an indication component that is outside the human vision range, but may be viewed by an automated system. When a shelf is placed over a particular sensor trigger element 211, then the visual sensor trigger element is blocked. A user, camera, or sensor reader may view the vertical plane 102 and determine where shelves are placed, based on the blocked sensor trigger elements 211. The identification markers 210 may also be different colors, to provide visual indications for each notch location to a user or camera. Those identification markers 210 that are blocked indicated the notch in which the shelf is arranged.

In some embodiments, a visual guided system, such as virtual reality, augmented reality and similar technology may be incorporated. The visual guided system may include a display showing where the shelf should be located. The display may show the gondola rack, with a virtual or augmented representation of where the shelf 116 is to be placed. The user may then set the shelf 116 in place. The sensors 121 and/or sensor trigger elements 211 may interact with a visual guided system, such as by including reflective or other properties, to indicate when the shelf is properly placed.

Consider the following example of a user of an augmented reality device setting a shelf. A server (or other computing device) can receive an image, GPS data, other information identifying what shelves are to be set, what items are to be placed on the shelf, the location of the gondola rack in the store. This information may come from a planogram and the like. Using information about the gondola rack and shelf, the server can generate a three-dimensional map of the gondola rack area, including where the shelf is to be set. The server can then send this best available location, together with any relevant information about the shelf or rack (weight, dimensions, special instructions), to the virtual or augmented reality device being used by a worker to set the shelf.

The virtual and augmented reality system can provide a user interface. This user interface can be, for example, a heads-up user interface which appears on a display surface visible to the user. Examples of this display surface can include glasses, a visor, contact lenses, etc. An on gondola rack number may be displayed on the heads-up user interface, along with other identifying information about the area and shelf being set filled by the user such as a position indicating where the associate is currently located (this is particularly useful where the associate is assigned to set multiple shelves, gamification information, and other information. These user interface aspects are closely linked with the visual guided system, which guide associates on where and how to place shelves within the rack. Additional aspects of the visual guided loading system can include providing information to the user regarding best positioning of the shelf and its surroundings.

The sensor trigger element 211 may include a conductive material. When a shelf is placed near a sensor trigger element 211, the conductive sensor trigger element 211 may form a voltage connection, or alternatively may break a voltage connection. This voltage connection or breakage may generate an indication of the shelf location.

Similarly, the notch identification tape may be utilized in conjunction with automated modular integrity validation. An automated modular integrity validation system may be linked with a central server that includes a predetermined plan for how shelves should be placed in a retail store. The automated system may utilize the predetermined plan to determine the proper placement of shelves in the store. For instance, an automated system may utilize the sensor trigger elements 211 located on the notch identification tape 200 in order to determine whether a shelf is placed in the correct location. The automated system may compare the location of a shelf or display component to the sensor trigger elements 211 (via a camera, sensors located on the shelf, or communications from the notch identification tape 200), to determine whether a display component is properly oriented. The automated system may make this determination according to a predetermined shelf design or plan. The automated system may be included on an automated device that is capable of roaming a retail store, or may be included on a handset that may be utilized by a user. A handset may vibrate or generate a visual or audible alert when a shelf is placed in the correct location, or alternatively when a shelf is placed in the incorrect location.

Two or more notch identification tapes 200 may be placed on the same vertical plane 102. For example, a notch identification tape 200 may be placed beside each row of notches 108 on the vertical plane 102. In this way, a user may view each of the notch identification tapes 200 to determine if a shelf is installed correctly—if the shelf is installed correctly, the shelf will be located at the same identification marker 210 in both columns of notches. In the case of an automated modular integrity validation system, the automated system may utilize sensor triggers 211 to determine the placement of the shelf on each notch identification tape 200, in order to determine if the shelf is installed correctly.

The two or more notch identification tapes 200 may also include processors that allow the notch identification tapes 200 to interact with each other. For instance, a first notch identification tape 200 may inform a second notch identification tape 200 that the shelf is located at a particular identification marker 210. The second notch identification tape 200 may determine that the shelf is located at an identification marker 210. If the identification markers 210 are not the same, the second notch identification tape 200 may produce a warning indication that the shelf is not level.

The notch identification tapes 200 may also include electromagnets at each identification marker 210. If the notch identification tape 200 determines that the shelf is not properly placed, the electromagnet may be energized by a power source. The energized electromagnet will then cause the improperly placed shelf to be repelled from the vertical plane 102. This will provide an indication to the user that the shelf is not properly placed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A modular shelf organization system for a gondola rack, the modular shelf organization system comprising:

a first marking member adapted to adhere to a vertical plane of a gondola rack, wherein the vertical plane comprises a first plurality of notches arranged in a vertical line along the vertical plane and includes a first sensor trigger element;

the first marking member comprising one or more identifiers located on a longitudinal surface of the first marking member such that when the first marking member is adhered to the vertical plane, each identifier is located adjacent to one of the first plurality of notches;

a second plurality of notches arranged in a vertical line along the vertical plane; and a second marking member adapted to adhere to the vertical plane, the second marking member comprising a second sensor trigger element and one or more identifiers located on a longitudinal surface of the marking member such that when the marking member is adhered to the vertical plane, each identifier is located adjacent to one of the second plurality of notches; and a shelf connected to the one of the first plurality of notches and one of the second plurality of notches to complete a connection between the first sensor trigger element and the second sensor trigger element to indicate that the shelf is correctly placed.

2. The modular shelf organization system of claim 1 further comprising, one or more display items adapted to attach to the notches on the vertical plane.

3. The module shelf organization system of claim 2, wherein the one or more display items comprises a shelf.

4. The module shelf organization system of claim 2, wherein the one or more display items comprises a basket.

5. The modular shelf organization system of claim 1, wherein each of the one or more identifiers located on the first marking member is the same as one of the one or more identifiers located on the second marking member.

6. The modular shelf organization system of claim 1, wherein each of the one or more identifiers located on the first marking member is the different from each of the one or more identifiers located on the second marking member.

7. The modular shelf organization system of claim 1, wherein the one or more identifiers are numerical identifiers.

8. The modular shelf organization system of claim 1, wherein the one or more identifiers are alphabetical identifiers.

9. The modular shelf organization system of claim 1, wherein the one or more identifiers are alphanumeric identifiers.

10. The modular shelf organization system of claim 1, further comprising a third plurality of notches arranged in a vertical line along the vertical plane; and a third marking member adapted to adhere to the vertical plane, the third marking member comprising one or more identifiers located on a longitudinal surface of the marking member such that when the marking member is adhered to the vertical plane, each identifier is located adjacent to one of the third plurality of notches.

11. A method for modular shelf organization of a gondola rack, the method comprising:

attaching a first marking member comprising one or more identifiers located on a longitudinal surface of the first marking member to a vertical plane of a gondola rack comprising a first plurality of notches arranged in a vertical line along the vertical plane and a first sensor trigger element, wherein the attaching step comprises attaching the first marking member such that each identifier is located adjacent to one of the first plurality of notches;

attaching a second marking member comprising a second trigger element and one or more identifiers located on a longitudinal surface of the second marking member to the vertical plane of a gondola rack, wherein the gondola rack further comprises a second plurality of notches arranged in a vertical line along the vertical plane, and attaching the second marking member such that each identifier is located adjacent to one of the second plurality of notches;

determining an attachment position for a removable display item based on a first identifier from the one or more identifiers, wherein the determining step comprises selecting a first notch of the first plurality of notches that is located adjacent to the first identifier;

attaching the removable display item comprising an attachment member to the vertical plane by inserting the attachment member into the first notch such that the removable display item is perpendicular to the vertical plane to complete a connection between the first sensor trigger element and the second trigger element.

12. The method for modular shelf organization of a gondola rack of claim 11, wherein the determining step further comprises identifying the first identifier based on a predetermined gondola rack design.

13. The method for modular shelf organization of a gondola rack of claim 11, wherein the removable display item comprises a shelf.

14. The method for modular shelf organization of a gondola rack of claim 11, wherein the removable display item comprises a basket.

15. The method for modular shelf organization of a gondola rack of claim 11, the method further comprising: attaching a third marking member comprising one or more identifiers located on a longitudinal surface of the third marking member to the vertical plane of a gondola rack, wherein the gondola rack further comprises a third plurality of notches arranged in a vertical line along the vertical plane, and wherein the attaching step comprises attaching the third marking member such that each identifier is located adjacent to one of the third plurality of notches.

16. The method for modular shelf organization of a gondola rack of claim 11, wherein the one or more identifiers are numerical identifiers.

17. The method for modular shelf organization of a gondola rack of claim 11, wherein the one or more identifiers are alphabetical identifiers.

18. The method for modular shelf organization of a gondola rack of claim 11, wherein the one or more identifiers are alphanumeric identifiers.

* * * * *